United States Patent [19]

Morishita et al.

[11] Patent Number: 4,549,128
[45] Date of Patent: Oct. 22, 1985

[54] CHARGING GENERATOR CONTROLLING DEVICE

[75] Inventors: Mitsuharu Morishita; Shinichi Kouge, both of Hyogo, Japan

[73] Assignee: Mitsubishi Denki Kabushiki Kaisha, Tokyo, Japan

[21] Appl. No.: 550,145

[22] Filed: Nov. 9, 1983

[30] Foreign Application Priority Data

| Nov. 9, 1982 [JP] | Japan | 57-197914 |
| Nov. 9, 1982 [JP] | Japan | 57-197915 |
| Nov. 9, 1982 [JP] | Japan | 57-197916 |
| Nov. 9, 1982 [JP] | Japan | 57-197917 |

[51] Int. Cl.[4] ........................... H02J 7/14; H02P 9/04
[52] U.S. Cl. ...................................... 322/99; 320/64; 361/20
[58] Field of Search ...................... 322/28, 99; 320/64, 320/68; 361/20

[56] References Cited

U.S. PATENT DOCUMENTS

| 4,316,134 | 2/1982 | Balan et al. | 322/99 |
| 4,336,487 | 6/1982 | Tanaka et al. | 322/99 |
| 4,362,982 | 12/1982 | Akita et al. | 322/99 X |
| 4,381,483 | 4/1983 | Muto et al. | 322/99 |
| 4,471,287 | 9/1984 | Morishita et al. | 322/28 X |

*Primary Examiner*—R. J. Hickey
*Attorney, Agent, or Firm*—Sughrue, Mion, Zinn, Macpeak, and Seas

[57] ABSTRACT

An improved charging generator controlling circuit which is capable of detecting failures which could not be detected with prior art such circuits, thereby providing greater security of the electrical system in the vehicle in which the circuit is employed. A full-wave rectifier rectifies the AC output of the armature coils of the generator, the rectifier including first and second rectifier output terminals and a ground terminal. The field coil is coupled to be excited by the output provided at the second rectifier output terminal of the rectifier. A battery is coupled to an output provided at the first rectifier output terminal of the rectifier to be charged thereby. A voltage regulator controls the application of exciting current to the field coil, thereby to maintain the output voltage from the generator at a first predetermined value. A charge display lamp is connected through a keyswitch between the battery and the ground terminal. A first switching unit is connected between the keyswitch and the second rectifier output terminal, while a second switching unit is connected in series with the charge display lamp and the ground terminal. A detector circuit detects the voltage at the second rectifier output terminal to thus detect the uncontrolled and non-power-generation states. A diagnosing unit actuates the switching units in response to outputs of the detector circuit.

4 Claims, 11 Drawing Figures

CHARGING GENERATOR CONTROLLING DEVICE

BACKGROUND OF THE INVENTION

The present invention relates to a charging generator controlling device which includes a switching unit and a diagnosing unit to detect and display abnormal states such as a non-power-generation state and uncontrolled state of the charging generator and for disconnecting a first rectifier output terminal when such a state is detected.

Figure 1:
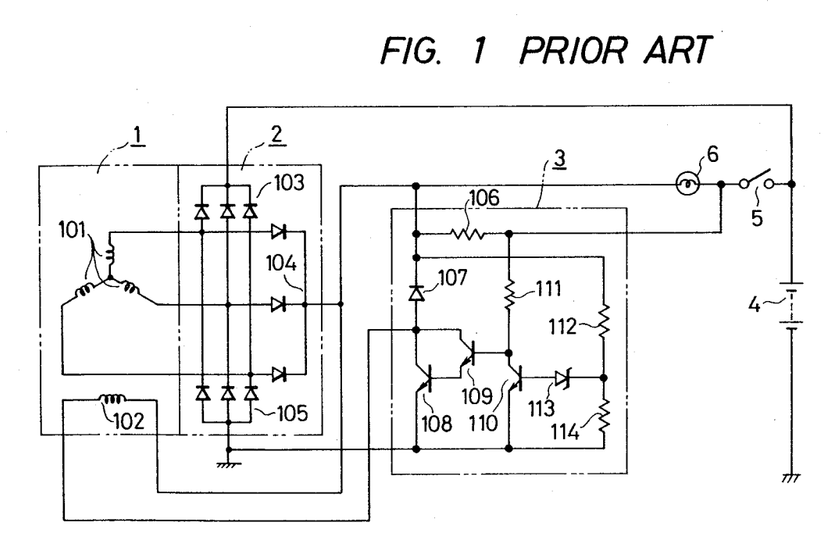
FIGS. 1 and 2 are schematic diagrams showing prior art charging generator controlling circuits of the same general type to which the invention pertains.

First, a conventional charging generator controlling device will be described with reference to FIG. 1. In FIG. 1, reference numeral 1 designates a three-phase AC generator, which may be mounted on a vehicle (not shown), and is driven by an engine (not shown). The AC generator includes three-phase star-connected armature coils and a field coil 102. In FIG. 1, reference numeral 2 designates a full-wave rectifier for full-wave rectifying the AC output of the generator 1; 103, 104 and 105, a first rectifier output terminal, a second rectifier output terminal and a ground terminal of the full-wave rectifier, respectively; and 3, a voltage regulator which controls the field current of the field coil 102 to thus maintain the output voltage of the generator 1 at a predetermined value $V_1$.

The voltage regulator 3 includes as shown in FIG. 1, a surge absorbing diode 107 connected between the terminals of the field coil 102, Darlington-connected transistors 108 and 109 for selectively interrupting the current in the field coil 102, a resistor 111 forming a base circuit for the transistors 108 and 109, a control transistor 110 for turning on and off the transistors 108 and 109, a Zener diode, 113 used to detect an output voltage at the second rectifier output terminal 104 of the generator 1 and which is rendered conductive when the output voltage reaches the first predetermined value $V_1$, resistors 112 and 114 connected in series to form a voltage divider circuit, and an initial exciting resistor 106 which is connected to a charge display lamp 6 and is used to supply initial exciting current to the generator 1 if the display lamp 6 is open circuited. Further in FIG. 1, reference numeral 4 designates a battery, and 5 a keyswitch.

The operation of the above-described conventional device will now be described.

When the keyswitch 5 is closed to start the engine, a base current is supplied from the battery 4 through the keyswitch 5 and the resistor 111 to the transistors 108 and 109, to thus render the transistors 108 and 109 conductive. When the transistors 108 and 109 are rendered conductive, a field current is supplied from the battery 4 through the keyswitch 5, the charge display lamp 6, the resistor 106, and the transistors 108 and 109 to the field coil 102, so that a field magnetomotive force is generated.

Then, when the engine is started and the generator 1 is driven thereby, AC outputs are induced in the armature coils 101 in a magnitude determined by the speed of rotation of the generator 1. The AC outputs thus induced are full-wave rectified by the full-wave rectifier 2. If the rectified output of the rectifier 2 is lower than the predetermined value $V_1$, the potential at the voltage dividing point of the voltage divider circuit composed of the resistors 112 and 114 will be low, and therefore the Zener diode 113 will be maintained nonconductive and the field current maintained supplied. Accordingly, the output voltage of the generator 1 increases with the speed of rotation. When the speed of rotation of the generator is further increased and the output voltage becomes higher than the first predetermined value $V_1$, the potential at the voltage dividing point of the voltage divider circuit also increases until the point that the Zener diode 106 is rendered conductive. Accordingly, base current is supplied through the Zener diode 113 to the transistor 110 to render the transistor 110 conductive. When the transistor 110 is conductive, the transistors 108 and 109 are rendered nonconductive. As a result, the current flowing to the field coil 102 is interrupted, whereupon the output voltage of the generator 1 decreases.

When the output voltage decreases to the first predetermined value $V_1$, the Zener diode 113 and the transistor 110 are rendered nonconductive again. As a result, the field coil 102 is energized and the output voltage of the generator 1 increases again.

The above-described operation is repeatedly carried out to maintain the output voltage of the generator 1 at the first predetermined value $V_1$. The output voltage thus controlled charges the battery 4. In this case, the output voltage at the second rectifier output terminal 104 is substantially equal to the first predetermined value $V_1$, and thus substantially equal to the voltage of the battery 4. Accordingly, the charge display lamp 6 is turned off, thus indicating the fact that the battery 4 has been charged.

The above-described conventional device is accompanied by certain disadvantages. Particularly, if there is a break in the exciting circuit, the charge display lamp 6 will not be turned on in the case when the generator 1 generates no electric power. Accordingly, it cannot be detected whether or not the battery is satisfactorily charged, and the battery may in fact be completely discharged. In addition, it cannot be detected when the first rectifier output terminal 103 is disconnected, and the output voltage of the generator is out of control.

Figure 2:
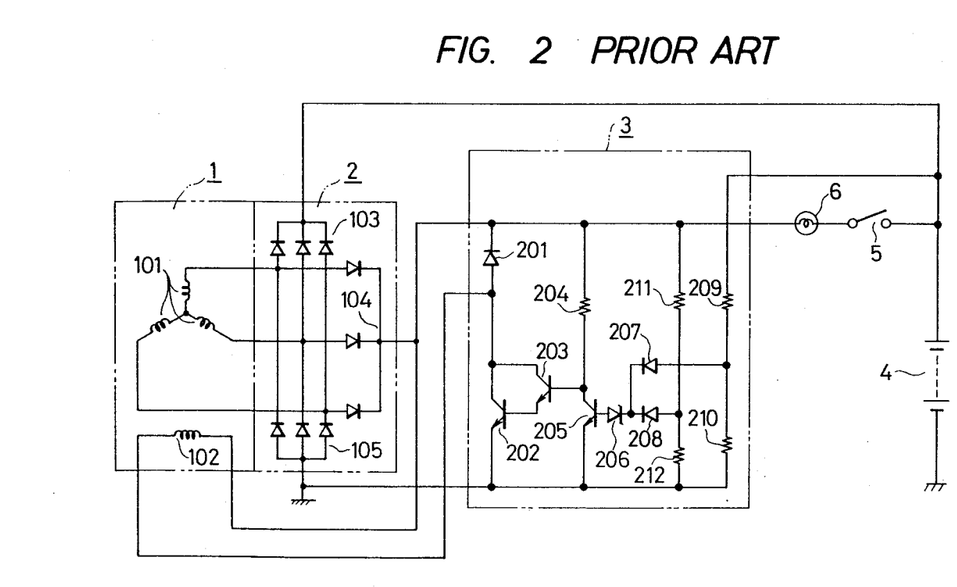

Another conventional charging generator controlling device will be described with reference to FIG. 2. In FIG. 2, reference numerals used in common with FIG. 1 designate like components, and hence detailed descriptions thereof will be omitted.

In this charging generator, the 3 regulator includes a surge absorbing diode 201 connected across the output terminals of the field coil 102, Darlington-connected transistors 202 and 203 for selectively interrupting the current in the field coil 102, a resistor 204 forming a base circuit for the transistors 202 and 203, a control transistor 205 for turning on and off the transistors 202 and 203, a Zener diode 206 connected to a base terminal of the control transistor 205, diodes 207 and 208 have cathodes connected together in a logical "OR" circuit arrangement and with the cathodes further being connected to the cathode of the Zener diode 206, resistors 209 and 210 connected in series to form a voltage divider circuit and series-connected resistors 211 and 212 forming a voltage divider circuit for the voltage appearing at the output of the second rectifier output terminal.

The operation of the second conventional device will now be described.

When the keyswitch 5 is closed to start the engine, base current is supplied from the battery 4 through the keyswitch 5, the display lamp 6 and the resistor 204 to the transistors 202 and 203, rendering the transistors 202 and 203 conductive. When the transistors 202 and 203 are conductive, field current is supplied from the battery 4 through the keyswitch 5, the charge display lamp 6, the field coil 102, and the transistors 202 and 203 to the field coil 102 so that a field magnetomotive force is generated.

When the engine is started and the generator 1 is driven thereby, AC outputs are induced in the armature coils 101 in a magnitude depending on the speed of rotation of the generator 1. The AC outputs thus induced are full-wave rectified by the full-wave rectifier 2. If the rectified output of the rectifier 2 is lower than the predetermined value $V_1$, the potential at the voltage dividing point of the voltage divider circuit composed of the resistors 209 and 210 is low, and therefore the Zener diode 206 is nonconductive and field current is maintained supplied. The output voltage of the generator 1 increases with the speed of rotation. When the speed of rotation of the generator increases to the point where output voltage becomes higher than the first predetermined value $V_1$, the potential at the voltage dividing point of the voltage divider circuit also increases, so that the Zener diode 206 is rendered conductive. Accordingly, base current is supplied through the Zener diode 206 to the transistor 205 to render the transistor 205 conductive. When the transistor 205 conducts the transistors 202 and 203 are rendered nonconductive. As a result, the current flowing to the field coil 102 is interrupted, and the output voltage of the generator 1 is decreased.

When the output voltage decreases to the first predetermined value $V_1$, the Zener diode 206 and the transistor 205 are rendered nonconductive again. As a result, the field coil 102 is energized and the output voltage of the generator 1 increases again.

As the above-described operation is repeatedly carried out, the output voltage of the generator 1 is maintained at the first predetermined value $V_1$. The output voltage thus controlled charges the battery 4. In this case, the output voltage at the second rectifier output terminal 104 is substantially equal to the first predetermined value $V_1$, and thus substantially equal to the voltage of the battery 4. Accordingly, the charge display lamp 6 is turned off, thus indicating the fact that the battery 4 has been charged.

If, in this case, the voltage of the battery 4 cannot be detected, for instance because of breakage of the wiring between the battery 4 and the resistor 209, the voltage at the second rectifier output terminal 104 is detected with the resistors 211 and 212 and maintained at the second predetermined value $V_2$ higher than the first predetermined value $V_1$.

An object of the invention is thus to provide a charging generator controlling device in which the above-described difficulties accompanying conventional charging generator controlling devices are eliminated.

SUMMARY OF THE INVENTION

Accordingly, the invention provides a charging generator controlling device with which failure modes, such as a non-power-generation state and an uncontrolled state, which could not be detected with prior art systems, are accurately detected, to thus turn on a charge display lamp and thereby protect the electrical system from damage.

Specifically, the system of the invention includes a charging generator having field and armature coils. A full-wave rectifier rectifies the AC output of the armature coils, the rectifier including first and second rectifier output terminals and a ground terminal. The field coil is coupled to be excited by the output provided at the second rectifier output terminal of the rectifier. A battery is coupled to an output provided at the first rectifier output terminal of the rectifier to be charged thereby. A voltage regulator controls the application of exciting current to the field coil, thereby to maintain the output voltage from the generator at a first predetermined value. A charge display lamp is connected through a keyswitch between the battery and the ground terminal. A first switching unit is connected between the keyswitch and the second rectifier output terminal, while a second switching unit is connected in series with the charge display lamp and the ground terminal. A detector circuit detects the voltage at the second rectifier output terminal to thus detect the uncontrolled and non-power-generator states. A diagnosing unit actuates the switching units in response to outputs of the detector circuit.

DESCRIPTION OF THE PREFERRED EMBODIMENTS

Figure 3:
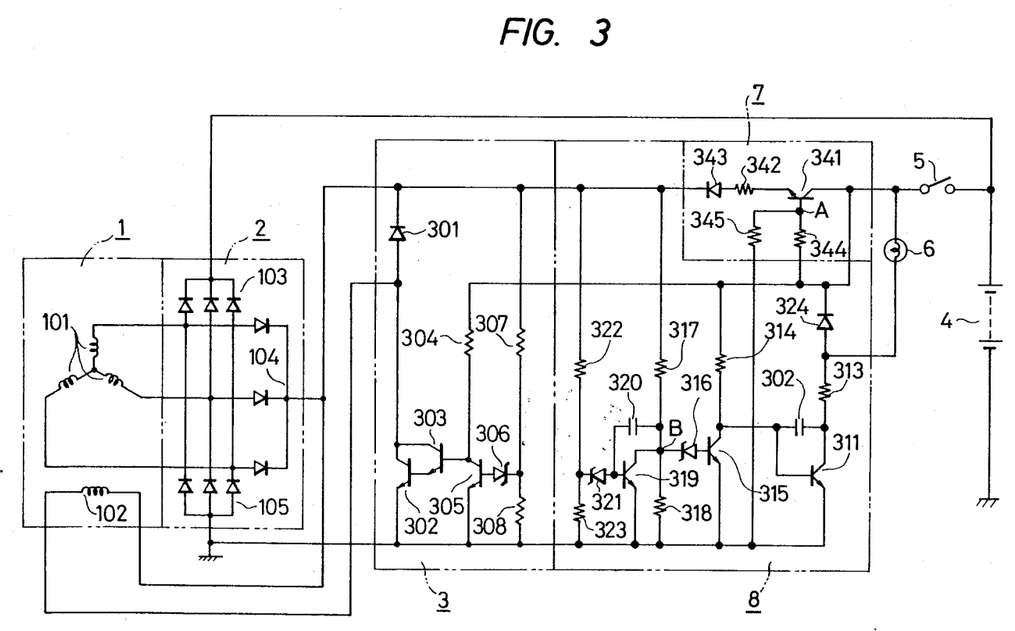
FIGS. 3, 5, 8 and 11 are schematic diagrams of first through fourth embodiments, respectively, of a charging generator controlling circuit of the invention.

A first preferred embodiment of the invention is shown in FIG. 3. In that figure, reference numeral 7 designates a switching unit which supplies a predetermined initial exciting current to the field coil 102 when the generator 1 is started which sets the output terminal (104) voltage to a desired value if the exciting circuit is partially disconnected. The switching unit 7 is made up of a serial control transistor 341 for controlling the initial exciting current, an initial exciting current setting resistor 342 connected in series with the emitter of the transistor 341, a diode 343 for preventing reverse current flow at the time of power generation, and series-connected resistors 344 and 345 which form a voltage divider circuit for a voltage at the point A.

Further in FIG. 3, reference numeral 8 designates a diagnosing unit which detects abnormal states, such as the non-power-generation state or uncontrolled state, and disconnects the first rectifier output terminal 103 at such a time to thus turn on the charge display lamp 6.

The diagnosing unit 8 includes a transistor 311 for driving the charge display lamp 6, a capacitor 312 for stabilizing the operation of the transistor 311, a resistor 313 connected between the lamp 6 and the transistor 311 provided to limit the current flowing in the transistor 311 when the lamp 6 is turned on, a resistor 314 connected to the base of the transistor 311, a transistor 315 which is turned off when any one of the above-described abnormal states is detected to then apply a base current through the resistor 134 to the transistor 311 to turn on the latter, a Zener diode 316 connected to the base of the transistor 315 with the Zener diode 316 being rendered non-conductive when any one of the abnormal states is detected, first and second resistors 317 and 318 which are connected in series to form a voltage divider circuit for the voltage at the second rectified output terminal 104 with those resistors rendering the Zener diode 316 nonconductive when the voltage at the terminal 104 is lower than the second value $V_2$, a transistor 319 which is rendered conductive when the voltage at the second rectifier output terminal 104 is a third predetermined value $V_3$ or higher (which is higher than the first predetermined value $V_1$) thus indicating the uncontrolled state, 321, a ripple absorbing capacitor 320, a Zener diode 321 connected to the base of the transistor 319, and which is rendered conductive when the voltage at the second rectifier output terminal 104 is the third predetermined value $V_3$ or higher, resistors 322 and 323 connected in series to a voltage divider circuit for the second rectifier output terminal (104) voltage, and a diode 324 for turning on the lamp 6 when the line between the connecting point of the keyswitch 5 and the lamp and the collector of the transistor 341 is broken.

The charging generator controlling device of the invention, described above, operates as follows:

When the keyswitch 5 is closed to start the engine, a base current is applied from the battery 4 through the keyswitch 5 and the resistor 344 to the base of the transistor 341 to render the latter conductive. As a result, field current is applied to the field coil 102 through a circuit composed of the keyswitch 5, the transistor 341, the resistor 342, the diode 343, the field coil 102, the transistors 302 and 303, and the battery 4, whereupon a field magnetomotive force is generated.

In the switching unit 7, when disconnection occurs in the exciting circuit, the voltage at the point A is determined approximately by the voltage division ratio of the resistors 344 and 345 and the voltage of the battery 4. The maximum value of the voltage at the point A is selected so that it is lower than the second predetermined value $V_2$. The initial exciting current is set by adjusting the resistor 342.

Under this condition, if the generator 1 is producing no power, the voltage at the second rectifier output terminal 104 will be lower than the second predetermined value $V_2$ and the Zener diode 316 will be non-conductive. As a result, the transistor 315 is turned off, and base current is applied through the resistor 314 to the transistor 311 to render the latter conductive, thus turn-ing the lamp 6 on.

When the engine is started and the generator 1 generates electric power, the output voltage of the generator 1 is maintained at the first predetermined value $V_1$ by the voltage regulator 3. In this case, the charge display lamp 6 is turned off to indicate that the generator 1 is generating electric power.

If components of the exciting circuit, namely, the field coil 102, the transistors 302 and 303 and connecting wiring become faulty or break, the voltage at the second rectifier output terminal 104 will become lower than the second predetermined value $V_2$. The lamp 6 is then turned on to indicate the non-power-generation state. When, because of failure of the voltage regulator 3, etc., the output voltage of the generator 1, exceeds the third predetermined value $V_3$ (with which the battery 4 would be overcharged), the voltage at the voltage dividing point of the voltage divider circuit which is provided for the voltage at the second rectifier output terminal 104 also increases. Owing to this voltage increase, the Zener diode 321 is rendered conductive to turn on the transistor 319. As a result, the point C is grounded, so that the Zener diode 316 is rendered non-conductive and the transistor 315 turned off. Therefore, the transistor 311 is rendered conductive by the base current supplied through the resistor 314 to turn on the charge display lamp 6.

Figure 4:
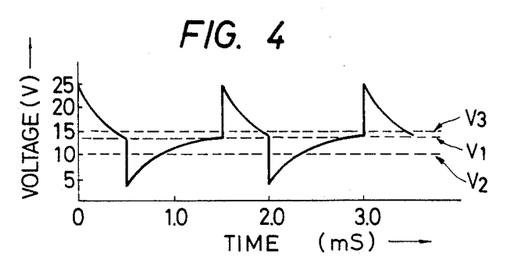
FIG. 4 is a waveform diagram used in explaining the operation of the circuit of FIG. 3.

In the case when, because of disconnection of the first rectifier output terminal 103, etc., the generator 1 produces electric power but the battery 4 is not charged, a voltage having a waveform as shown in FIG. 4 is present at the first and second rectifier output terminals 103 and 104. This voltage periodically exceeds the third predetermined value $V_3'$ as shown in FIG. 4.

During such periods, the Zener diode 322 is rendered conductive, and the transistor 319 is therefore intermittently supplied with base current. However, the transistor 319 is then continuously conductive, due to the action of the capacitor 321. Hence, similar to the case of the uncontrolled state, the charge display lamp 6 is turned on.

If the wiring between the connecting point of the keyswitch 5 and the lamp 6 and the collector of the transistor 341 is broken, base current is supplied from the battery 4 through the keyswitch 5, the lamp 6, diode 324 and the resistor 314 to the transistor 311.

Figure 5:
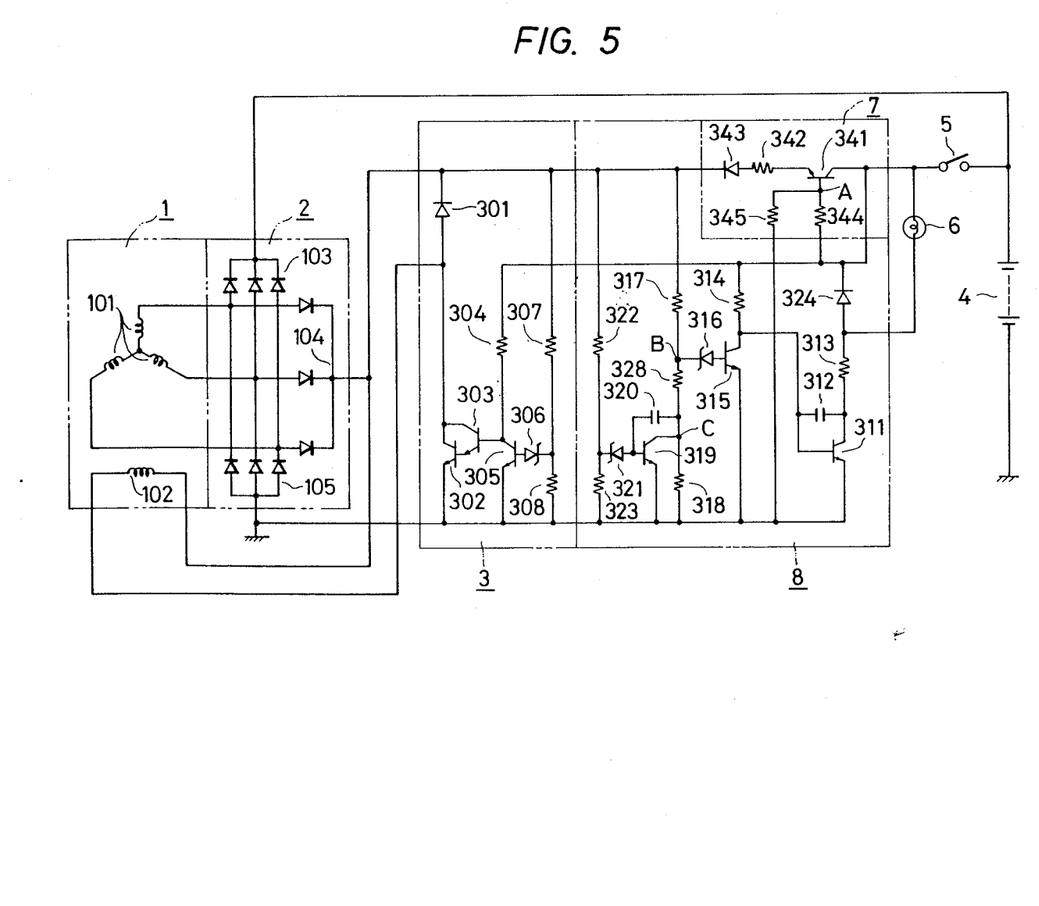

A second preferred embodiment of the invention is shown in FIG. 5, in which reference numerals used commonly with FIG. 3 designate like components. In this embodiment, a resistor 328 is inserted between the cathode of the Zener diode 316 and the collector of the transistor 319. This establishes a fourth predetermined value $V_4$, as will never be explained.

When the keyswitch 5 is closed to start the engine, a base current is applied from the battery 4 through the keyswitch 5 and the resistor 344 to the base of the transistor 341 to render the latter conductive. As a result, field current is applied to the field coil 102 through a circuit compared of the keyswitch 5, the transistor 341, the resistor 342, the diode 343, the field coil 102, the transistors 302 and 303, and the battery 4, whereupon a field magnetomotive force is generated.

In the switching unit 7, when disconnection occurs in the exciting circuit, the voltage at the point A is determined approximately by the voltage division ratio of the resistors 344 and 345 and the voltage of the battery 4. The maximum value of the voltage at the point A is selected so that it is lower than the second predetermined value $V_2$, which is lower than the first predetermined value $V_1$, thus indicating the non-power-generation state. The initial exciting current is set by adjusting the resistor 342.

Under this condition, if the generator 1 is producing no power, the voltage at the second rectifier output terminal 104 will be lower than the second predetermined value $V_2$ and the Zener diode 316 will be non-conductive. As a result, the transistor 315 is turned off, and base current is applied through the resistor 314 to the transistor 311 to render the latter conductive, thus turning the lamp 6 on.

When the engine is started and the generator 1 generates electric power, the output voltage of the generator 1 is maintained at the first predetermined value $V_1$ by the voltage regulator 3. In this case, the charge display lamp 6 is turned off to indicate that the generator 1 is generating electric power. This state corresponds to a normal operational range as indicated at c in FIG. 7.

If components of the exciting circuit, namely, the field coil 102, the transistors 302 and 303 and connecting wiring become faulty or break, the voltage at the second rectifier output terminal 104 will become lower than the second predetermined value $V_2$. The lamp 6 is then turned on to indicate the non-power-generation state. This state corresponds to a non-power-generation range, in which the lamp 6 is lit, as indicated at d in FIG. 7.

When, because of failure of the voltage regulator 3, etc., the output voltage of the generator 1 exceeds the third predetermined value $V_3$ (with which the battery 4 would be overcharged), the voltage at the voltage dividing point of the voltage divider circuit which is provided for the voltage at the second rectified output terminal 104 also increases. Owing to this voltage increase, the Zener diode 321 is rendered conductive to turn on the transistor 319. As a result, the point C is grounded, so that the Zener diode 316 is rendered nonconductive and the transistor 315 is turned off. Therefore, the transistor 311 is rendered conductive by the base current supplied through the resistor 314 to turn on the charge display lamp 6. This state is in an uncontrolled range, as indicated at b in FIG. 7, where the lamp 6 is also turned on.

When the voltage at the second rectifier output terminal 104 increases and exceeds the fourth predetermined value $V_4$, which is higher than the third predetermined value $V_3$, the transistor 315 is turned on and the lamp 6 turned off. Thus, the display lamp 6 and the transistor 311 are protected from damage. This state represents an uncontrolled range as indicated at a in FIG. 7, in which the lamp 6 is turned off.

Figure 6:
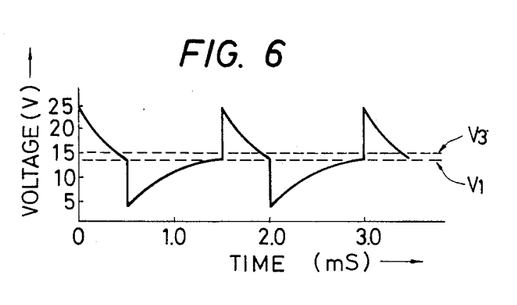
FIG. 6 is a waveform diagram used in explaining the operation of the circuit of FIG. 5.

In the case when, because of disconnection of the first rectifier output terminal 103, etc., the generator 1 produces electric power, but the battery 4 is not charged, a voltage having a waveform as shown in FIG. 6 is provided at the first and second rectifier output terminals 103 and 104. This voltage periodically exceeds the third predetermined value $V_3$, as shown in FIG. 6.

During such periods, the Zener diode is rendered conductive, and the transistor 319 is therefore, intermittently supplied with base current. However, the transistor 319 is then continuously conductive, due to the action of the capacitor 321. Hence, similar to the case of the uncontrolled state, the charge display lamp 6 is turned on.

Figure 7:
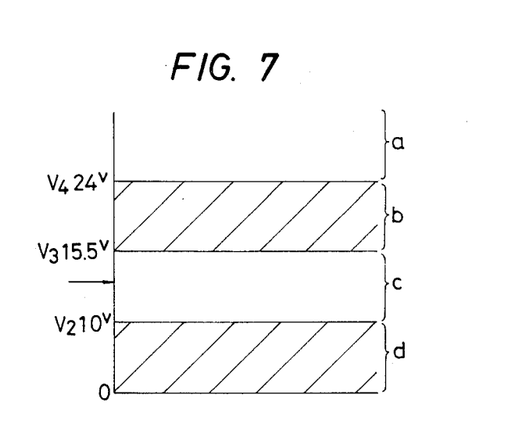
FIG. 7 is an explanatory diagram used in conjunction with the explanation of the circuit of FIG. 5.

If the wiring between the connecting point of the keyswitch 5 and the lamp 6 and the collector of the transistor 341 is broken, base current is supplied from the battery 4 through the keyswitch 5, the lamp 6, diode 324 and the resistor 314 to the transistor 311. As a result, the transistor 311 is rendered conductive to turn on the charge display lamp. FIG. 7 shows the operation of the charge display lamp 6 with respect to the voltage at the second rectifier output terminal 104.

The diagnosing unit 8 may be implemented with a comparator, with the same effects as those in the above-described example of the charging generator controlling device.

As described in detail, in the first and second embodiments of a charging generator controlling device of the invention, failure states namely, the non-power-generation state, the uncontrolled state and disconnection of the first rectifier output terminal, which cannot be detected by the conventional system, are detected to turn on the charge display lamp. Specifically, the non-power-generation state is detected by setting the voltage at the point A lower than the second predetermined value $V_2$ when no power is generated, the uncontrolled state is detected utilizing the third predetermined value $V_3$, and disconnection of the first rectifier output terminal 103 is detected by the utilization of the fact that the output voltage periodically exceeds the third predetermined value $V_3$.

Accordingly, the controlling device of the invention prevents the battery from being discharged when no electric power is generated or the first rectifier output terminal is disconnected, and from being overcharged or the electrical load damaged when the output voltage is not regulated. Furthermore, because the charge display lamp is turned off by utilizing the fourth predetermined value $V_4$, the charge display lamp is protected from damage. Although the controlling device of the invention utilizes simple circuitry, it nevertheless is capable of positively detecting and displaying abnormal states.

A third embodiment of a charging generator controlling device of the invention will now be described with reference to FIGS. 8 through 10.

Figure 8:
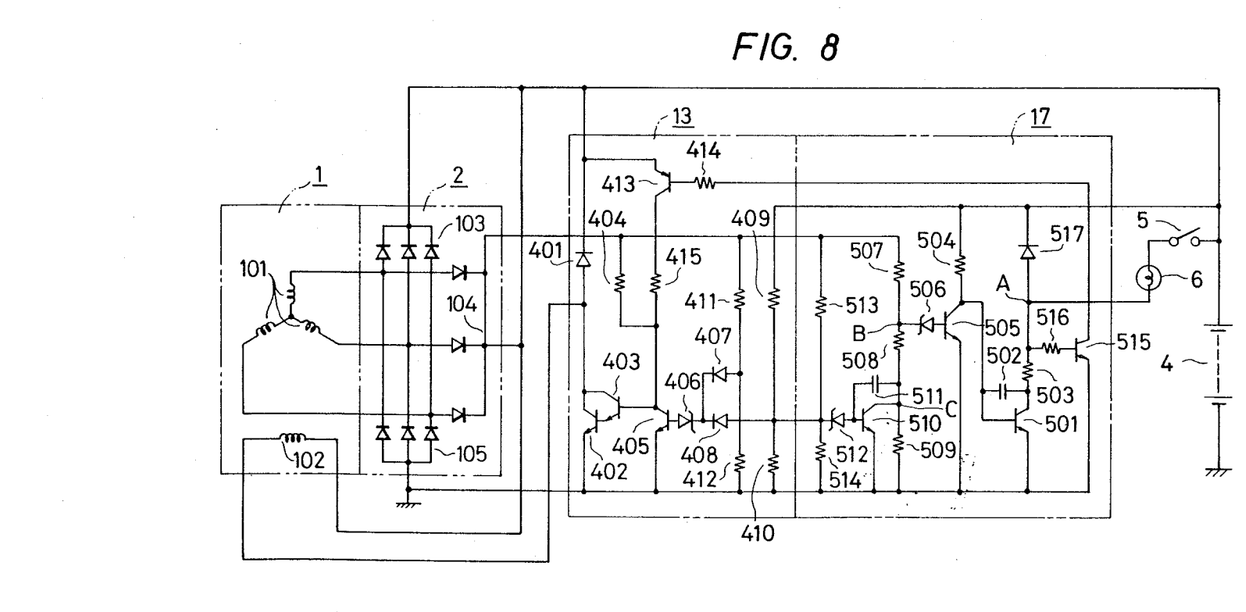
Figure 9:
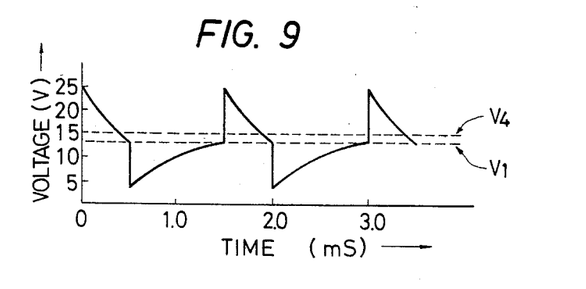
FIG. 9 is a waveform diagram used in explaining the operation of the circuit of FIGS. 8 and 11.

In FIG. 8, reference numeral 13 designates a voltage regulator in which a first transistor 413 is driven by a second transistor 515 described later when the keyswitch 5 is closed. Reference numeral 414 designates a resistor for providing a base current to the first transistor, and reference numeral 415 designates a resistor through which base current is supplied to the transistors 402 and 403 when the generator is started.

Further, in FIG. 8, reference numeral 18 designates a diagnosing unit which detects abnormal states such as the non-power generation state, uncontrolled state and disconnection of the first rectifier output terminal 103, to turn on the charge display lamp 6.

The diagnosing unit 17 a transistor 501 for driving the charge display lamp 6, a capacitor 502 for stabilizing the operation of the transistor 501, a resistor 503 connected between the lamp 6 and the transistor 501 for limiting the amount of current flowing in the transistor 501 when the lamp 6 is turned on and for setting a voltage appearing at a point A for turning on the third transistor 506 a resistor 504 connected to the base of the transistor 501, a transistor 505 which is turned off when any one of the above-described abnormal states is detected to thus apply a base current through the resistor 804 to the transistor 501 to turn on the latter, a Zener diode 506 connected to the base of the transistor 505 and which is rendered nonconductive when any one of the abnormal states is detected, series-connected through third resistors 507 through 509, which form a voltage divider circuit for the voltage at the second rectifier output terminal 104, a transistor 510 which is rendered conductive when the voltage at the second rectifier output terminal 104 is at or higher than a third predetermined value $V_3$ which is higher than the first predetermined value $V_1$ and is indicative of the uncontrolled state, a ripple absorbing capacitor 511, a Zener 512 diode connected to the base of the transistor 511, a Zener 512 diode connected to the base of the transistor 510 which conducts when the voltage at the second rectifier output terminal 104 is at or higher than the third predetermined value $V_3$, series-connected resistors 513 and 514 forming a voltage divider circuit for the second rectifier output terminal 104 voltage, a second transistor 515 for driving the first transistor 413 when the keyswitch 5 is closed, a resistor 516 connected to the base terminal of the second transistor 515, and a diode 517 for turning on the lamp 6 when the line between the battery 4 and the connecting point of the resistors 409 and 504 is broken.

The operation of this embodiment of a charging generator controlling device according to the invention will now be described.

When the keyswitch 5 is closed to start the engine but before the engine actually starts, the voltage at the second rectifier output terminal 104 becomes lower than a third predetermined value $V_5$, which is lower than the first predetermined value $V_1$, indicating the fact that no electric power is being generated. Therefore, the transistor 505 is turned off. Accordingly, base current is supplied through the resistor 504 to the transistor 501 to render the latter conductive. Therefore, the charge display lamp 6 is turned on. The resistance value of the resistor 503 is set so that the second transistor 515 can be rendered conductive by the potential at the point A. As a result, a base current is supplied through the resistor 516 to the second transistor 515 to render the latter conductive, whereupon the first transistor 413 is rendered conductive as base current is supplied from the battery 4 through the resistor 414. Because the second transistor 515 is conductive, the first transistor 413 is supplied with base current through the resistor 414 and is thereby rendered conductive. Then, base current is supplied to the transistors 402 and 413 from the battery 4 through the first transistor 413 and the resistor 415. As a result, the transistors 402 and 403 are rendered conductive, and field current is applied to the field coil 102 through a circuit composed of the battery 4 and the transistor 402 and 403 so that a field magnetomotive force is induced.

When the engine is started and the generator 1 begins to generate electric power, the output voltage of the generator 1 which is applied to the terminals of the battery 4, is maintained at the first predetermined value $V_1$ by the voltage regulator 13. In this case, the charge display lamp 6 is turned off to indicate that the generator 1 is generating electric power. This state is within a normal operation range as indicated at c in FIG. 10. When, under this condition, the terminal voltage of the battery 4 cannot be detected, for instance, because the wiring between the battery 4 and the resistor 409 is broken, the voltage at the second rectifier output terminal 104 is detected with the resistors 411 and 412, and controlled to a second predetermined value $V_2$ higher than the first predetermined value $V_1$. At this time, the lamp 6 is turned on because the transistor 510 is turned on by the base current flowing through the circuit composed of the battery 4, the keyswitch 5, the lamp 6, the diode 517 and the resistor 504.

If parts of the exciting circuit, namely, the field coil 102, the transistors 402 and 403 and wiring become defective or break, the voltage at the second rectifier ououtput terminal 102 will become lower than the third predetermined value $V_3$, and hence the charge display lamp 6 is turned on to indicate the non-power-generation state. This state corresponds to the range indicated at d in FIG. 10.

If, because of a fault in the voltage regulator 13, etc., the output voltage of the generator 1 becomes uncontrolled (outside the first and second predetermined values $V_1$ and $V_2$) and exceeds a fourth predetermined value $V_4$ with which the battery 4 would be overcharged, the voltage at the voltage dividing point of the voltage divider circuit also increases. Due to this voltage increase, the Zener diode 512 is rendered conductive, turning on the transistor 510. As a result, the point C is grounded, so that the Zener diode 506 is rendered nonconductive and the transistor 505 turned off. Therefore, the transistor 501 is rendered conductive by base current supplied through the resistor 504, to thus turn on the charge display lamp 6. Ths state is an uncontrolled state in which the lamp 6 is turned on, as indicated at b in FIG. 10.

When the voltage at the second rectifier output terminal 104 exceeds a fifth predetermined value $V_5$ which is higher than the fourth predetermined value $V_4$, the voltage at the point B will be sufficient to render the transistor 505 conductive, and thus to turn off the display lamp 6. The display lamp 6 and the transistor 501 are hence protected from damage. This state is an uncontrolled state, within a range indicated at a in FIG. 10, in which the lamp 6 is turned off.

If, for example, disconnection of the first rectifier output terminal 103 occurs, the generator 1 produces electric power but the battery 4 will not be charged. A voltage having a waveform as shown in FIG. 9 is then present at the first and second rectifier output terminals 103 and 104. This voltage periodically exceeds the fourth predetermined value $V_4$ as shown in FIG. 9. During such periods, the Zener diode 512 is rendered conductive, and the transistor 510 is intermittently supplied with base current. However, the transistor 510 conducts continuously due to the action of the capacitor 511. As in the case of the uncontrolled state, the charge display lamp 6 is turned on.

A still further example of a charging generator controlling device constructed according to the invention will be described with reference to FIG. 11.

Figure 11:
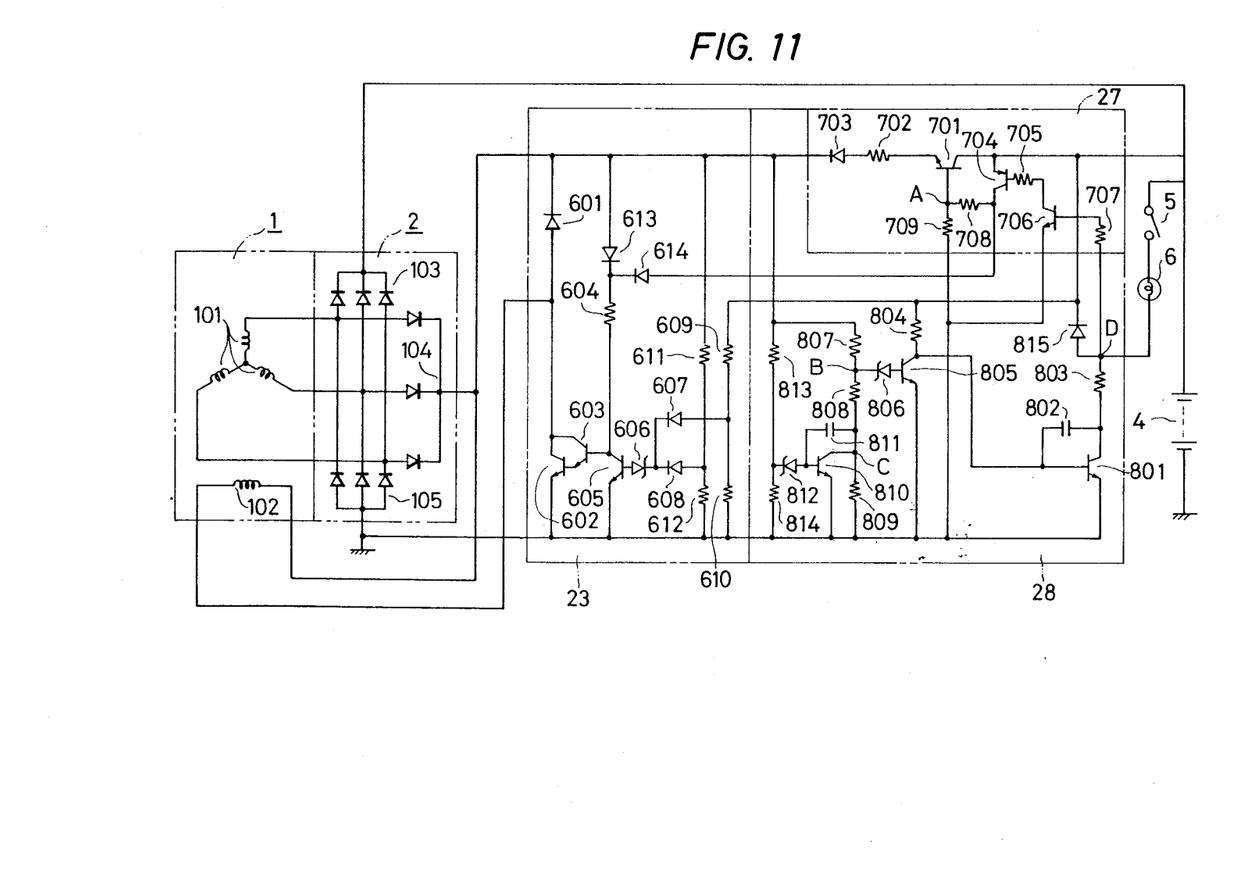

In FIG. 11, reference numeral 25 designates a voltage regulator in which diodes 613 and 614 are connected in a logical "OR" arrangement. Base current is supplied to the transistors 602 and 603 through the diodes 613 and 614 and the resistor 604. Reference numeral 27 designates a switching unit which supplies a predetermined initial exciting current, the magnitude of which can be varied, to the field coil 102 when the generator 1 is started, and which sets the second rectifier output terminal (104) voltage to a desired value when the exciting circuit is partially disconnected.

The switching unit 27 includes a serial control transistor 701 for controlling the initial exciting current, an initial exciting current setting resistor 702 connected in series with the emitter of the transistor 701, a diode 703 for preventing reverse current flow at the time of power generation, a second transistor 704 driven and made conductive by a third transistor 706 when the keyswitch 5 is turned on, and a resistor 705 connected to the base of the transistor 704. The third transistor 706 is rendered conductive when the keyswitch 5 is turned on by current supplied through a resistor 707. Reference numerals 708 and 709 designate series-connected resistors forming a voltage divider circuit for the voltage at a point A.

Further in FIG. 11, reference numeral 28 designates a diagnosing unit which detects abnormal states such as the non-power-generation state, uncontrolled state and disconnection of the first rectifier output terminal 104, and turns on the charge display lamp 6 in the presence of such states.

The diagnosing unit 28 includes a transistor 801 for driving the charge display lamp 6, a capacitor 802 for stabilizing the operation of the transistor 801, a resistor 803 connected between the lamp 6 and the transistor 801 for limiting the amount of current flowing in the transistor 801 when the lamp 6 is turned on and for providing a voltage appearing at a point D sufficient to turn on the third transistor 706, a resistor 804 connecteda to the base of the transistor 801, a transistor 805 which is turned off when any one of the above-described abnormal states is detected to cause a base current to be applied through the resistor 804 to the transistor 801 to turn on the latter, a Zener diode 806 connected to the base of the transistor 805 and rendered nonconductive when any one of the abnormal states is detected, first through third series-connected resistors 807 through 809 forming a voltage divider circuit for the voltage at the second rectifier output terminal 104, a transistor 810 which is rendered conductive when the voltage at the second rectifier output terminal 104 is a third predetermined value $V_3$ or higher (which is higher than the first predetermined value $V_1$) thus indicating the uncontrolled state, a ripple absorbing capacitor 811, a Zener diode 812 connected to the base of the transistor 810 and rendered conductive when the voltage at the second rectifier output terminal 104 is at the third predetermined value $V_3$ or higher, series-connected resistors 813 and 814 forming a voltage divider circuit for the second rectifier output terminal 104 voltage, and a diode 815 for turning on the lamp 6 when the line between the connecting point of the keyswitch 5 and the lamp and the collector of the transistor 701 is broken.

The operation of the charging generator controlling device thus constructed will now be described.

When the keyswitch 5 is closed to start the engine but before the engine actually starts, the voltage at the second rectifier output terminal 104 is below a third predetermined value $V_3$, which is lower than the first predetermined value $V_1$, indicating the fact that no electric power is being generated. Therefore, the transistor 805 is turned off. Accordingly, base current is supplied through the resistor 804 to the transistor 801 to render the latter conductive, and therefore the charge display lamp 6 is turned on. In addition, the third transistor 706 is rendered conductive by current supplied the resistor 707. As a result, base current is supplied through the resistor 705 and the third transistor 706 to the second transistor 704 to render the latter conductive, whereupon the transistor 701 is rendered conductive by base current supplied from the battery 4 through the transistor 704 and the resistor 708 to the transistor 701. At the same time, base current is supplied from the battery 4 through the transistor 704, the diode 614 and the resistor 604 to the transistors 602 and 603 to render the latter two devices conductive.

When the transistors 602 and 603 and the transistor 701 conduct, field current is applied to the field coil through a circuit composed of the baterry 4, the transistor 701, the resistor 702, the diode 703, the field coil 102 and the transistors 602 and 603 so that a field magnetomotive force is induced.

When the exciting circuit is inoperative because of a defect in the field coil 102 or the transistors 602 and 603, while the transistor 704 is conductive, the voltage at the point A in the switching unit 27 is substantially determined by the voltage division ratio of the resistors 708 and 709 and the voltage of the battery 4. The maximum value of the voltage at the point A is so selected that it is lower than a third predetermined value $V_3$, which is lower than the first predetermined value $V_1$, thus indicating the fact that no electric power is being produced.

When, under this condition, the engine is started and the generator 1 generates electric power, the output voltage of the generator 1, which is applied to the terminals of the battery 4, is maintained at the first predetermined value $V_1$ by the voltage regulator 3. In this case, the charge display lamp 6 is turned off to indicate that the generator 1 is generating electric power. This state is within the normal operational range, as indicated at c in FIG. 10.

If, under this condition, the terminal voltage of the battery 4 cannot be detected, for instance because the wiring between the battery 4 and the resistor 609 is broken, the voltage at the second rectifier output terminal 104 is detected using the resistors 611 and 611 and maintained at a second predetermined value $V_2$ higher than the first predetermined value $V_1$.

Figure 10:
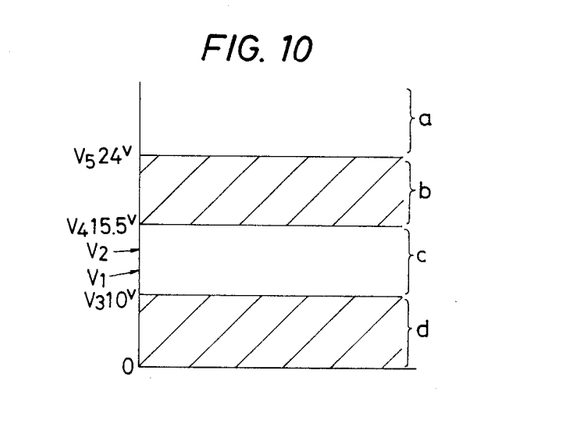
FIG. 10 is an explanatory diagram used in conjunction with the explanation of the circuit of FIGS. 8 and 11.

If parts of the exciting circuit, namely, the field coil 102, the transistors 602 and 603 and, connecting wiring become detective or broken, the voltage at the second rectifier output terminal 104 will be lower than the third predetermined value $V_3$, and hence the charge display lamp 6 will be turned on to indicate the non-power-generation state, are depicted at d in FIG. 10.

If, because of a fault in the voltage regulator 23, etc., the output voltage of the generator 1 becomes uncontrolled (outside the first and second predetermined values $V_1$ and $V_2$) and exceeds a fourth predetermined value $V_4$ with which the battery 4 would be overcharged, the voltage at the voltage dividing point of the voltage divider circuit also increases. Due to this voltage increase, the Zener diode 812 is rendered conductive, turning on the transistor 810. As a result, the point C is grounded, so that the Zener diode 806 is rendered nonconductive and the transistor 805 is turned off. Therefore, the transistor 801 is rendered conductive by the base current supplied through the resistor 804, to thus turn on the charge display lamp 6. This state is an uncontrolled state in which the lamp 6 is turned on, as indicated at b in FIG. 10.

When the voltage at the second rectifier output terminal 104 exceeds a fifth predetermined value $V_5$, which is higher than the fourth predetermined value $V_4$, then the voltage at the point B will be sufficient to render the transistor 805 conductive, and thus to turn off the display lamp 6 is turned off. Thus, the display lamp 6 and the transistor 801 are hence protected from damage. This state is an uncontrolled state, within a range indicated at a in FIG. 10, in which the lamp 6 is turned off.

If, for example disconnection of the first rectifier output terminal 103 occurs, the generator 1 produces electric power but the battery 4 will not be charged. A voltage having a waveform as shown in FIG. 9 is then present at the first and second rectifier output terminals 103 and 104. This voltage periodically exceeds the fourth predetermined value $V_4$ as shown in FIG. 9. During such periods of time, the Zener diode 812 is rendered conductive, and the transistor 810 is intermittently supplied with base current. However, the transistor 810 conducts continuously due to the action of the capacitor 811. As in the case of the uncontrolled state, the charge display lamp 6 is turned on.

If the connection between the battery 4 and the collector of the transistor 701 is broken, base current will be supplied from the battery 4 through the keyswitch 5, the display lamp 6, the diode 815 and the resistor 804 to the transistor 801. As a result, the transistor 801 will be rendered conductive, turning on the charge display lamp 6.

As described in detail above, in this embodiment of a charging generator controlling device of the invention, abnormal states, namely the non-power-generation state, the uncontrolled state, and disconnection of the first rectifier output terminal, which cannot be detected by the conventional system, are detected to turn on the charge display lamp. Specifically, the non-power-generation state is detected by setting the voltage at the point A lower than the third predetermined value $V_3$. The uncontrolled state is detected by utilizing the fourth predetermined value $V_4$. Disconnection of the first rectifier output terminal is detected by the utilization of the fact that, in that case, the output voltage periodically exceeds the fourth predetermined value $V_4$.

Accordingly, the controlling device of the invention can prevent the battery from being excessively discharged if no electric power is generated or the first rectifier output terminal is disconnected, and the battery from being overcharged or the electrical load damaged if the output voltage is not regulated. Furthermore, the charge display lamp is turned off by utilizing the fifth predetermined value $V_5$. Thus, the display lamp 6 and the transistor 801 are protected from damage.

Moreover, the charging generator controlling device of the invention has a simple circuit configuration. The device can detect and display abnormal states without increasing the number of external connecting terminals. Thus, the device of the invention can be made compact and with a low manufacturing cost.

Since the initial exciting current from the battery 4 flows through the switching unit 7, the voltage build-up characteristic of the generator 1 is much improved compared with that in the conventional system in which the initial exciting current flows through the charge display lamp 6.

We claim:

1. A charging generator controlling device comprising:
   a charging generator having field and armature coils;
   rectifier means for rectifying AC outputs induced in said armature coils of said charging generator, said rectifier means having first and second rectifier output terminals and a ground terminal, said field coil being coupled to an output terminal of said rectifier means to be excited thereby;
   a battery coupled to an output provided at said first rectifier output terminal of said rectifier means;
   voltage regulation means for controlling application of current to said field coil, to thereby maintain an output voltage of said generator at a first predetermined value;
   a charge display lamp connected through a keyswitch between said battery and said ground terminal;
   a first switching unit connected between said keyswitch and said second rectifier output terminal;
   a second switching unit connected in series with said charge lamp and said ground terminal;
   detection means for detecting said second rectifier output terminal voltage to thereby detect uncontrolled and non-power-generation states; and
   a diagnosing unit for actuating said switching units in response to outputs of said detection means.

2. A charging generator controlling device comprising:
   a charging generator having field and armature coils;
   rectifier means for rectifyingf AC outputs induced in said armature coils of said charging generator, said rectifier means having first and second rectifier output terminals and a ground terminal, said field coil being coupled to an output provided at said second rectifier output terminal of said rectifier means to be excited thereby;
   a battery charged by an output provided at said first rectifier output terminal of said rectifier means to be charged thereby;
   voltage regulator means for controlling application of current to said field coil, to thereby maintain an output voltage of said generator at a first predetermined value;
   a charge display lamp connected through a keyswitch between said battery and said ground terminal;
   a switching unit connected between said keyswitch and said second rectifier output terminal; and
   a diagnosing unit for detecting abnormal states of said generator, to thereby control the operation of said charge display lamp, said diagnosing unit comprising:
   a series circuit of first, second and third resistors which form a voltage divider circuit for a voltage provided at said second rectifier output terminal;
   non-power-generation detection circuit means having an input coupled to be driven by a voltage at a connecting point of said first and second resistors and operating to turn on said display lamp when said voltage reaches a second predetermined value lower than said first predetermined value; and
   uncontrolled state detection circuit means including a detection transistor circuit which becomes conductive when said voltage at said second rectifier output terminal reaches a third predetermined value higher than said first predetermined value,
   said detection transistor being coupled to ground a connecting point of said second and third resistors to turn on said display lamp, and said display lamp being turned off when said voltage at said second rectifier output terminal exceeds a fourth predetermined value which is higher than said third predetermined value.

3. A charging generator controlling device comprising:
   a charging generator having field and armature coils;
   rectifier means for rectifying AC outputs induced in said armature coils of said charging generator, said rectifier means having first and second rectifier output terminals and a ground terminal, said field coil being coupled to an output provided at said second rectifier output terminal of said rectifier means to be excited thereby;
   a battery coupled to an output provided at said first rectifier output terminal of said rectifier means to be charged thereby;
   voltage regulator means for detecting a terminal voltage of said battery and controlling application of current to said field coil thus to maintain an output voltage of said generator, provided to the terminals of said battery, at a first predetermined value, and when said terminal voltage of said battery cannot be detected, to maintain a voltage at said second rectifier output terminal at a second predetermined voltage, said voltage regulator means comprising semiconductor switching means;

a charging display lamp connected through a keyswitch between said battery and said ground terminal;

a diagnosing unit comprising a switching element connected in series between said display lamp and said ground terminal, said diagnosing unit detecting an abnormal state of said generator and rendering said switching means conductive when said abnormal state is detected;

said voltage regulator means further comprising a first transistor for controlling said semiconductor switching means and interrupting current to said field coil when said generator starts; and said diagnosing unit further comprising a second transistor for driving said first transistor when said keyswitch is closed.

4. A charging generator controlling device comprising:

a charging generator having field and armature coils;

rectifier means for rectifying AC outputs induced in said armature coils of said charging generator, said rectifier means having first and second rectifier output terminals and a ground terminal, said field coil being coupled to an output provided at said second rectifier output terminal of said rectifier means to be excited thereby;

a battery coupled to an output provided at said first rectifier output terminal of said rectifier means to be charged thereby;

voltage regulator means for detecting a terminal voltage of said battery and controlling application of current to said field coil to maintain an output voltage of said generator, provided at the terminals of said battery, at a first predetermined value, and maintaining, when said terminal voltage of said battery cannot be detected, a voltage at said second rectifier output terminal at a second predetermined voltage;

a charge display lamp connected through a keyswitch between said battery and said ground terminal;

a diagnosing unit comprising a first transistor having a collector and an emitter connected, respectively, to said display lamp and said ground terminal, said diagnosing unit detecting an abnormal state of said generator to render said first transistor conductive; and a switching unit comprising:

a second transistor, connected between said battery and said second rectifier output terminal for selectively connecting and disconnecting said battery and said second rectifier output terminal;

a third transistor having an emitter-to-collector path connected in series with a base of said first transistor, said third transistor being controllably coupled to an output of said diagnosing unit to be rendered conductive when said first transistor in said diagnosing unit is rendered conductive to thereby render said second transistor conductive;

a fourth transistor having an emitter-to-collector path connected in series between a base of said second transistor and said ground terminal, said fourth transistor having a base coupled to an output of said keyswitch to be rendered conductive when said keyswitch is turned on to thereby drive said third transistor; and a voltage divider circuit for voltage dividing an emitter voltage of said second transistor, a voltage division point of said voltage divider circuit being connected to a base of said first transistor, said voltage divider circuit setting a base voltage of said first transistor to a predetermined value when said second transistor is conductive.

* * * * *